(12) United States Patent
Wang et al.

(10) Patent No.: US 6,369,756 B1
(45) Date of Patent: Apr. 9, 2002

(54) METHOD AND APPARATUS FOR OPTIMIZING THE USAGE OF AN ANTENNA ARRAY BEAMFORMING TECHNIQUE

(75) Inventors: Shu-Shaw Wang, Arlington; R. Thomas Derryberry, Plano, both of TX (US)

(73) Assignee: Nokia Networks OY, Espoo (FI)

( * ) Notice: Subject to any disclaimer, the term of this patent is extended or adjusted under 35 U.S.C. 154(b) by 0 days.

(21) Appl. No.: 09/537,049

(22) Filed: Mar. 28, 2000

(51) Int. Cl.$^7$ ................................................ H04B 7/00

(52) U.S. Cl. .................................................... 342/367

(58) Field of Search ........................ 342/357.01, 357.1, 342/368, 367, 457

(56) References Cited

U.S. PATENT DOCUMENTS 5,596,330 A * 1/1997 Yokev et al. ............... 342/387
5,844,522 A * 12/1998 Sheffer et al. .............. 342/457
5,945,948 A * 8/1999 Buford et al. .............. 342/457

OTHER PUBLICATIONS

"ESPRIT—Estimation of Signal Parameters Via Rotational Invariance Techniques", IEEE Transactions on Acoustics, Speech, and Signal Processing, vol. 37. No. 7, Jul. 1989.

* cited by examiner

Primary Examiner—Dao Phan
(74) Attorney, Agent, or Firm—Banner & Witcoff, Ltd.

(57) ABSTRACT

In a communication device that includes an antenna array including multiple antennas, a method and apparatus is provided for optimizing the usage of an antenna array beamforming technique. The communication device determines a bearing from the communication device to the communication unit and a direction of arrival for a signal received from the communication unit by the communication device via each of the multiple antennas. In addition, the communication device determines a distance from the communication device to the communication unit, and also determines multiple signal quality metrics based on multiple signals received by the communication device from the communication unit. The communication device then determines whether to employ an antenna array beamforming technique based on any one or more of the determined bearing and the determined direction of arrival, the determined distance, or the determined signal quality metrics, thereby optimizing the usage of the antenna array beamforming technique.

20 Claims, 6 Drawing Sheets

METHOD AND APPARATUS FOR OPTIMIZING THE USAGE OF AN ANTENNA ARRAY BEAMFORMING TECHNIQUE

TECHNICAL FIELD

The present invention relates to wireless telecommunication systems, and more particularly to the use of antenna arrays in wireless telecommunication systems.

BACKGROUND OF THE INVENTION

In a wireless telecommunication system that includes multiple mobile subscriber units and a base site connected to an antenna array that includes multiple antennas, a broadcast by the base site to an active subscriber unit can interfere with a broadcast to another active subscriber unit. The interference can cause unacceptable degradation of the radio frequency (RF) signal received by the subscriber unit, resulting in diminished performance and possibly a dropped call. In order to minimize the interference, methods have been developed for adaptively forming an antenna array beam pattern that results in a more focused broadcast of a signal to the intended subscriber unit and reduced interference with other active subscriber units using the same base site and antenna array.

Many techniques have been proposed for adaptively forming an antenna array beam pattern. A number of these techniques provide for focusing an antenna array beam in the direction of maximum received (by the base site from the subscriber unit) signal strength. That is, the techniques determine a separate amplitude and phase adjustment for each portion of a signal received from a subscriber unit via each of the multiple antennas before the signal portions are combined, thereby allowing the base site to resolve the received signal and interfering signals, nulling out the interfering signals and optimizing the received signal. When the base site transmits a signal to the subscriber unit, the amplitude and phase adjustments that are determined based on the received signal are in turn applied to each portion of the signal that is being transmitted by each of the multiple antennas.

There may be situations, however, when it is disadvantageous to form an antenna beam for the purpose of broadcasting a signal to a subscriber unit. For example, a subscriber unit might be located behind an obstruction, with the result that a signal focused in the direction of maximum received signal strength, which is the perceived direction of the subscriber unit, is instead merely focused on an edge of the obstruction. A widely broadcast signal will more easily diffuse around the obstruction than a narrowly beamed signal and will have a better chance of reaching the subscriber unit than the beamed signal. Another situation where a focused beam is disadvantageous is when the subscriber unit is located in an environment where fading makes it exceedingly difficult to determine a location of the subscriber unit based on received signal strength. A beamed signal may end up being targeted in the wrong direction. Or a subscriber unit may be operating at a declining power level due to problems with the unit's power source and will not be able to acceptably receive a slightly misdirected beamed signal. Therefore, a need exists for a method and apparatus that provides a determination of when a situation is appropriate for employment of an antenna array beamforming technique.

SUMMARY OF THE INVENTION

In a communication device that includes an antenna array including multiple antennas, the present invention provides a method and apparatus for optimizing a usage of an antenna array beamforming technique. In one embodiment, the communication device determines a bearing from the communication device to a communication unit and determines a direction of arrival of a signal received from the communication unit by the communication device via each of the multiple antennas. The communication device compares the bearing to the direction of arrival, determines a difference between the two, and compares the determined difference to a predetermined difference threshold. The communication device then determines whether to employ an antenna array beamforming technique based on the comparison of the determined difference to the predetermined difference threshold.

In an alternative embodiment, the communication device determines a distance between the base site and the communication unit and compares the determined distance to a predetermined distance threshold. The communication device then determines whether to employ an antenna array beamforming technique based on the comparison of the determined distance to the predetermined distance threshold.

In another alternative embodiment, the communication device determines multiple signal quality metrics based on multiple signals received from the communication unit, compares the multiple signal quality metrics to each other, and determines whether to employ an antenna array beamforming technique based on the comparison of the multiple signal quality metrics.

By determining whether to employ an antenna array beamforming technique based on a comparison of the determined difference to the predetermined difference threshold, the determined distance to the predetermined distance threshold, or the multiple signal quality metrics to each other, the present invention optimizes the usage of the antenna array beamforming technique by determining to employ a maximum beamwidth broadcast in an environment where a misdirected beamed signal may not be acceptably received by the communication unit and determining to employ an antenna array beamforming technique in an environment where a beamed signal can be acceptably directed to the communication unit.

DETAILED DESCRIPTION OF THE PREFERRED EMBODIMENT

Figure 1:
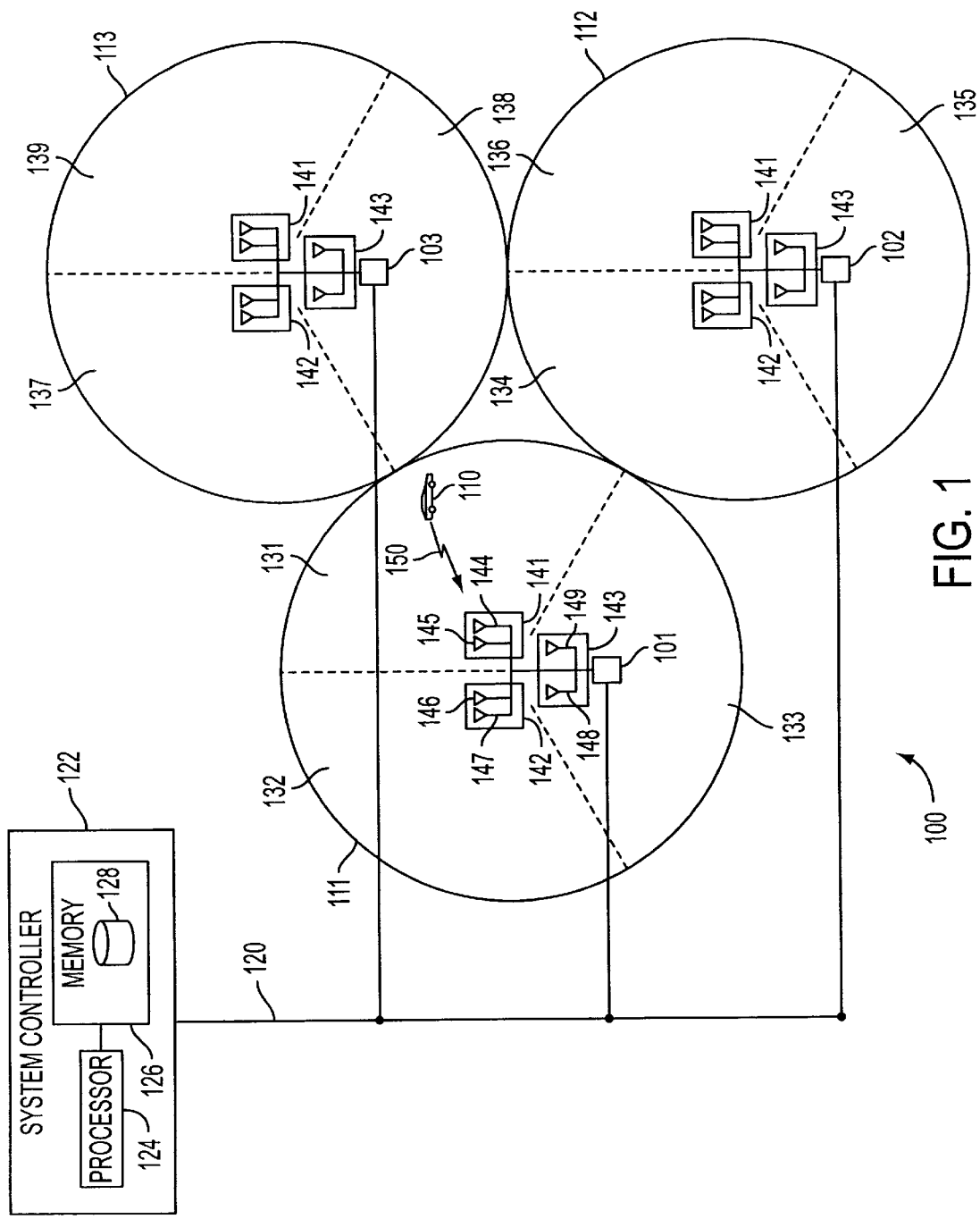
FIG. 1 is a block diagram of a wireless telecommunication system in accordance with a preferred embodiment of the present invention.

The present invention may be more fully described with reference to FIGS. 1–5b. FIG. 1 is a block diagram of a wireless telecommunication system 100 in accordance with a preferred embodiment of the present invention. Wireless telecommunication system 100 includes multiple geographically-diverse communication devices 101–103 (three shown), preferably base sites, that are coupled to each other and to a system controller 122 via a network 120, such as dedicated T1 phone lines or microwave links. The three base sites 101–103, the system controller 122, and the network 120 are collectively referred to as a fixed infrastructure. Being fixed in place, the precise location of each base site 101–103 is known with high accuracy as determined by surveying or other methods of geographic location determination. System controller 122 includes a processor 124, preferably a microprocessor, digital signal processor (DSP), or microcontroller, and associated memory 126 that allows controller 122 to store data, run programs, and make computations. Preferably, memory 126 further includes a location database 128 that includes the locations of all of the base sites 101–103 in system 100. Alternately, location database 128 may be located anywhere in system 100, such as in one of base stations 101–103, and coupled to the other components of system 100 via network 120.

Each base site 101–103 provides communication service to a respective service coverage area 111–113. Each coverage area 111–113 is subdivided into three sectors, that is, coverage area 111 is subdivided into sectors 131–133, coverage area 112 is subdivided into sectors 134–136, and coverage area 113 is subdivided into sectors 137–139. Each sector 131–139 spans approximately 120° of a 360° span of the sector's respective coverage area 111–113. Each base site 101–103 preferably includes multiple antenna arrays 141–143 (three shown), wherein each antenna array is associated with one of the sectors of the coverage area in which the base site resides. In turn, each antenna array 141–143 includes multiple directional antennas (i.e., antenna array 141 includes antennas 144, 145 (two shown), antenna array 142 includes antennas 146, 147 (two shown), and antenna array 143 includes antennas 147,148 (two shown)), resulting in multiple directional antennas being associated with each sector of a coverage area. Those who are of ordinary skill in the art realize that the more antennas included in an antenna array, the more narrowly focused a beam may be transmitted by the array.

Figure 2:
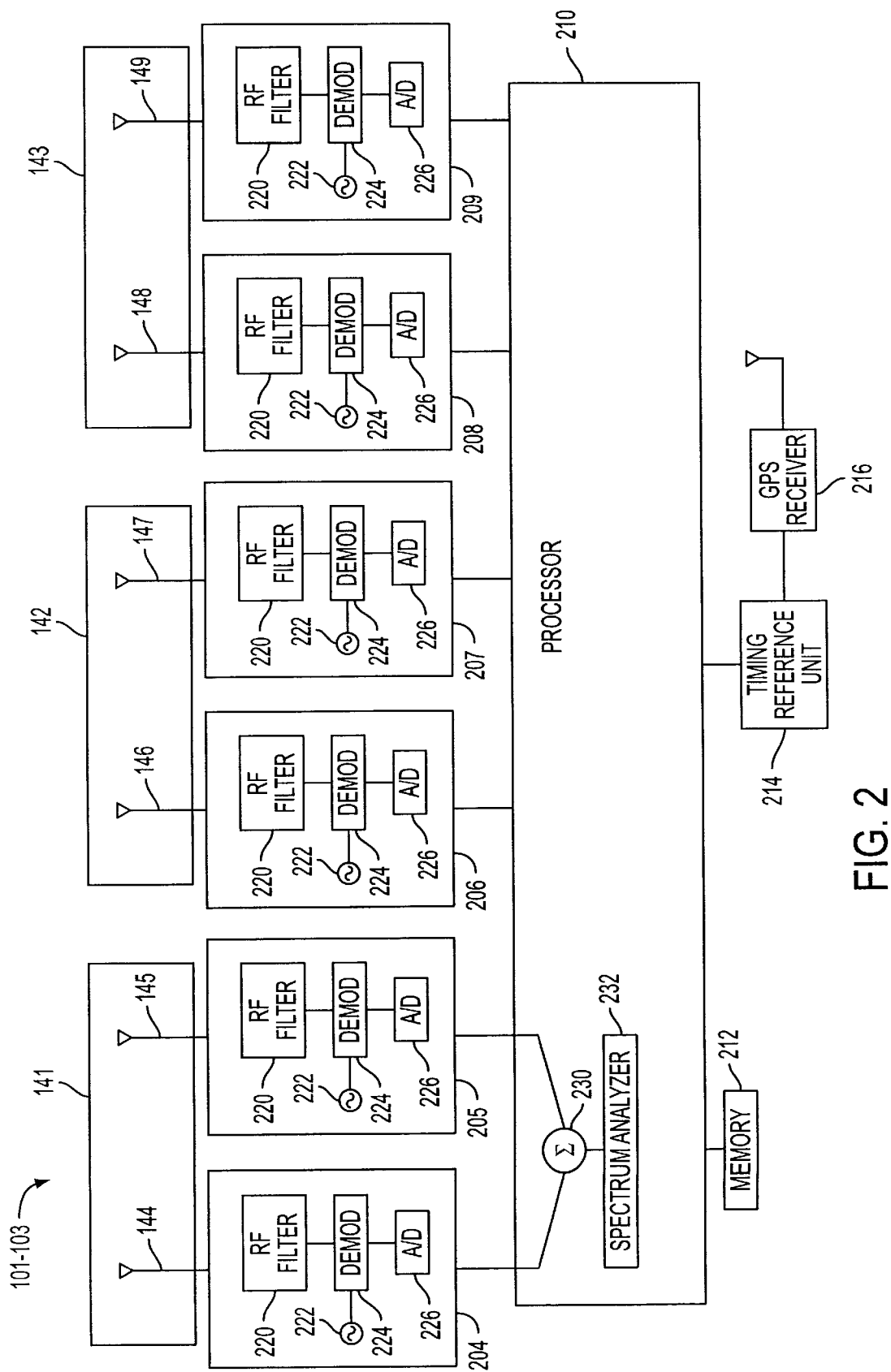
FIG. 2 is a block diagram of a base site of FIG. 1 in accordance with a preferred embodiment of the present invention.

FIG. 2 is a block diagram of a base site 101–103 in accordance with a preferred embodiment of the present invention. Each base site 101–103 preferably includes multiple antenna arrays 141–143 and their associated antennas 144–149. Each antenna 144–149 is coupled to a respective receiver unit 204–209 that includes a demodulator 224 coupled to each of a radio frequency (RF) filter 220, a local oscillator 222, and an analog-to-digital converter 226. Each receiver unit 204–209 is further coupled to a processor 210, preferably a microprocessor or a digital signal processor (DSP). Processor 210 and an associated memory 212, preferably a random access memory (RAM), allow the base site to store information, make computations, and run software programs. Each base site 101–103 further includes a timing reference unit 214 coupled to processor 210 that provides a timing reference for the base site and a Global Positioning Satellite (GPS) receiver 216 that is coupled to the timing reference unit 214.

Each base site 101–103 has access to a common time base which the base site uses to synchronize its timing reference unit 210. In the preferred embodiment, the common time base is provided by the GPS receiver 212 at each base site 101–103, which GPS receiver 212 has access to a GPS satellite signal; however, those of ordinary skill in the art realize that there are other methods of supplying a highly accurate common time base to each of base sites 101–103, such as a synchronization unit that is connected to the base site via a dedicated T1 link that is a part of the network 120 and that is dedicated to time synchronization, which synchronization unit generates a common time base and supplies the common time base to each of base sites 101–103 via the T1 link, or a mobile unit situated at a known location that broadcasts a signal received by each of base sites 101–103 and which signal serves as a synchronizing time base for the base sites, which other methods may be used without departing from the spirit and scope of the present invention.

Figure 3:
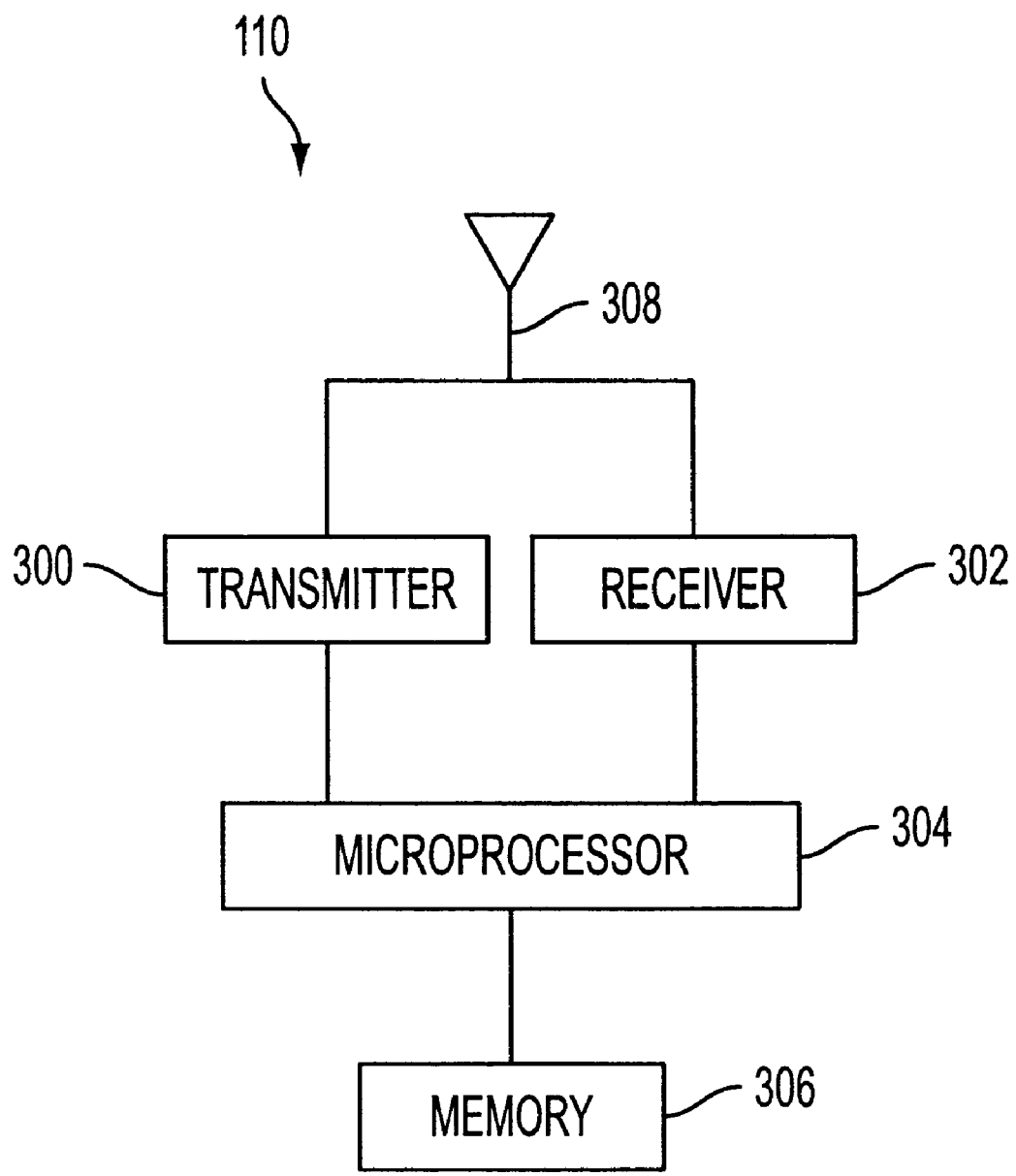
FIG. 3 is a block diagram of a communication unit of FIG. 1 in accordance with a preferred embodiment of the present invention.

Telecommunication system 100 also includes multiple communication units 110, only one of which is shown in FIG. 1. Communication unit 110 preferably is a cellular telephone or a radiotelephone and, as shown in FIG. 3, preferably includes an antenna 308, a transmitter 300 and a receiver 302 that are each coupled to antenna 308 and to a microprocessor 304, and a memory 306 coupled to microprocessor 304.

As communication unit 110 roams throughout the system 100, system controller 122 assigns a base site (e.g., base site 101) to serve as a serving base site for the communication unit 110. The serving base site 101 manages and provides radio communication services for communication unit 110 while the communication unit is located in a sector (i.e., sector 131) of serving base site's service coverage area 111.

In order to optimize the strength of an RF signal received by communication unit 110 from base site 101, and to minimize the interference of the RF signal with communications between base site 101 and other active communication units in sector 131, base site 101 employs an antenna array beamforming technique for the broadcast of the RF signal. The antenna array beamforming technique allows base site 101 to broadcast a narrowly focused signal to communication unit 110. However, in certain signal propagation situations, such as where fading has a significant impact on the reception of the RF signal or where an obstruction blocks line of sight communications between communication unit 110 and base site 101, the employment of an antenna beamforming technique may result in a signal that is beamed in a direction different from the actual direction to communication unit 110. Depending upon a discrepancy between a direction of the beamed signal as determined by the antenna beamforming technique and a direction to the communication device, it may instead be advantageous for base site 101 to broadcast at maximum beamwidth. Therefore, the present invention provides a method and apparatus for optimizing a usage of the antenna array beamforming technique by determining whether to employ the antenna beamforming technique or instead to broadcast at maximum beamwidth.

The operation of system 100 in determining whether to employ an antenna beamforming method is as follows. System 100 determines a geographical location of communication unit 110. In the preferred embodiment, communication unit 110, which is synchronized with respect to the common time base, transmits a signal to each of base sites 101–103. The signal includes an identifier, such as an identifying sequence of symbols, that uniquely corresponds to communication unit 110, and further includes synchronization symbols, pilot symbols, and a time of transmission indication relative to the common time base. Upon receiving the signal from communication unit 110, each of base sites 101–103 determines a time of arrival for the signal and transmits the determined time of arrival to serving base site 101. Processor 210 of base site 101 queries location database 128 to obtain the locations of base sites 101–103, and determines the location of communication unit 110 based on the base site locations, the time of arrival information received from each of base sites 101–103, and by using triangulation or another geographical intersection techniques that are stored as programs in memory 212. Processor 210 then stores the determined location in memory 212.

In an alternative embodiment of the present invention, each of base sites 101–103 transmits their respectively determined times of arrival to controller 122. Processor 124 of controller 122 queries location database 128 to obtain the locations of base sites 101–103, and determines the location of communication unit 110 based on the base site locations, the time of arrival information received from each of base sites 101–103, and by using triangulation or another geographical intersection techniques that are stored as programs in memory 126. Controller 122 then conveys the location of communication unit 10 to base site 101, where the location is stored in memory 212.

In another alternative embodiment of the present invention, each base site 101–103 transmits a signal to the communication unit 110 in order to determine a geographical location of communication unit 110. Each signal includes an identifier, such as an identifying sequence of symbols, that uniquely corresponds to the base site 101–103 transmitting the respective signal. Each signal also includes a time of transmission indication relative to the common time base. Upon receiving the signals from the base sites 101–103, communication unit 110 determines a time difference of arrival for each signal with respect to each of the other signals, and transmits the determined time differences of arrival to controller 122 via one of base sites 101–103. Processor 124 in controller 122 queries location database 128 to obtain the locations of base sites 101–103, and determines the geographical location of communication unit 110 based on the base site locations, the time difference of arrival information received from communication unit 110, and by using triangulation or another geographical intersection techniques that are stored as programs in memory 126. Controller 122 then conveys the location of communication unit 110 to base site 101, where the location is stored in memory 212.

In yet another alternative embodiment of the present invention, communication unit 110 further includes a GPS receiver coupled to microprocessor 304 and antenna 308 and self-determines its geographical location by employing the GPS receiver to receive signals from at least three of a constellation of GPS satellites. Communication unit 110, preferably microprocessor 304, then determines its own location based on the satellite signals and in accordance with known techniques of triangulation as applied to GPS systems, which techniques are stored as programs in memory 306. Communication unit 110 then conveys the determined location to base site 101, where the location is stored in memory 212.

Processor 210 in base site 101, or alternately processor 124 in controller 122, then determines a distance between base site 101 and communication unit 110. Processor 210 executes a distance determination algorithm that is stored in memory 212, or alternately in memory 126, which algorithm utilizes the location of base site 101 stored in location database 128 and the determined location of communication unit 110 stored in memory 212, or alternately in memory 126. Processor 210 also determines a bearing from base site 101 to communication unit 110 based on the two stored locations. Processor 210 compares the determined distance to a predetermined distance threshold, for example 150 meters, that is stored in memory 212. Among factors considered in determining a predetermined distance threshold are the average speed of communication units in the sector (i.e., sector 131) and the obstructions existing in the sector, so that when a communication unit is so close to the serving base site that a maximum bandwidth beam has ample energy to reach the communication unit, or is changing locations so quickly that a narrowly focused beam would have to be frequently readjusted, a maximum beamwidth beam is preferred. Those who are of ordinary skill in the art realize that a variety of distances may be used for a predetermined distance threshold, and that the particular threshold employed is up to the designer of the system.

When the determined distance is less than or equal to the predetermined distance threshold, then base site 101 determines not to employ an antenna array beamforming technique and to instead broadcast at a maximum beamwidth. When the determined distance is greater than the predetermined distance threshold, then processor 210 determines whether to employ an antenna array beamforming technique based on the determined location of communication device 110 and a direction of arrival (DOA) of a signal received by base site 101 from communication unit 110, which DOA is determined as described below.

System 100 determines a DOA of a signal received by a base site from a communication unit serviced by the base site as follows. A communication unit (i.e., communication unit 110) located in a sector (i.e., sector 131) serviced by a serving base site (i.e., base site 101) is allocated a communication channel, preferably including a frequency bandwidth, for radio frequency (RF) communications between communication unit 110 and base site 101. Communication unit 110 transmits an RF signal 150 in the allocated communication channel to base site 101, which RF signal 150 is available for reception at each of the multiple antennas 144, 145 of antenna array 141.

Signal 150 is received by a first antenna 144 of the multiple antennas 144, 145 of antenna array 141 to produce a first received signal, and by a second antenna 145 of the multiple antennas 144, 145 to produce a second received signal. Antenna 144 conveys the first received signal to a first receiver unit 204 of the multiple receiver units 204–209 and antenna 145 conveys the second received signal to a second receiver unit 205 of the multiple receiver units 204–209.

In receiver unit 204, the first received signal is conveyed to an RF filter 220, where out-of-band noise is removed from the signal to produce a first filtered signal. The first filtered signal is conveyed to a demodulator 224, along with a reference signal that is generated by a local oscillator 222. Preferably, the frequency of the reference signal is approximately a frequency of signal 150. Demodulator 224 mixes the first filtered signal with the reference signal to produce a first baseband signal. The first baseband signal is conveyed to an A/D 226 that digitizes the first baseband signal to produce a first digitized baseband signal. Receiver unit 204 then conveys the first digitized baseband signal to processor 210.

Similar to the processing of the first received signal, in receiver unit 205 the second received signal is conveyed to an RF filter 220, where out-of-band noise is removed from the signal to produce a second filtered signal. The second filtered signal is conveyed to a demodulator 224, along with a reference signal that is generated by a local oscillator 222. Preferably, the frequency of the reference signal is approximately a frequency of signal 150. Demodulator 224 mixes the second filtered signal with the reference signal to produce a second baseband signal. The second baseband signal is conveyed to an A/D 226 that digitizes the second baseband signal to produce a second digitized baseband signal. Receiver unit 206 then conveys the second digitized baseband signal to processor 210.

Upon receiving each of the first digitized baseband signal and the second digitized baseband signal, processor 210 determines a time of arrival (TOA), or alternatively a phase of arrival, for each of the first received signal and the second received signal. Each TOA or phase of arrival determination is made with reference to the common time base and is based on known delays in the path of each of the first and second received signals from the respective receiving antennas 144, 145 to processor 210, which delays are stored in memory 212.

Processor 210 then determines a direction of arrival (DOA) for signal 150 by executing a DOA algorithm stored in memory 212. The DOA algorithm determines a DOA for signal 150 based on the TOA determinations for each of the first and second received signals and further based on a predetermined spatial separation and directional alignment of each of the multiple antennas 144, 145 in array 141 with respect to the other antennas in the array. Preferably, the spatial separation, preferably one-half wavelength, and directional alignment of each of multiple antennas 144,145 are stored in memory 212. Alternatively, the DOA algorithm may determine a DOA for signal 150 based on a phase of the signal as received at each of multiple antennas 144, 145 and the predetermined spatial separation and alignment of each of the multiple antennas. There are many algorithms available to determine a DOA. One such algorithm, used in the preferred embodiment, is an Estimation of Signal Parameters via Rotational Invariance Techniques (ESPRIT) algorithm, which algorithm is described in the paper "ESPRIT—Estimation of Signal Parameters via Rotational Invariance Techniques," IEEE Transactions on Accoustics, Speech, and Signal Processing, vol. 37, no. Jul. 7, 1989. Another algorithm that may be used here is Multiple Signal Identification and Classification (MUSIC). Processor 210 then conveys the determined DOA to memory 212, where the determined DOA is stored in a data array.

In the preferred embodiment, the above procedures whereby processor 210 receives a signal from communication unit 110 via each of the multiple antennas 144, 145 of array 141, determines a DOA for the received signal, and stores the DOA in memory 212, are repeated every 1.25 milliseconds (ms). After accumulating 320 DOA determinations in the data array in memory 212, which takes approximately 0.4 seconds, processor 210 determines a DOA mean and a DOA variance, based on the accumulated DOA determinations, by executing a statistical analysis program that is stored in memory 212. The DOA mean constitutes an estimated geographical direction from base site 101 to communication unit 110 based on an incoming direction of the signals received by base site 101 from communication unit 110.

Figure 4:
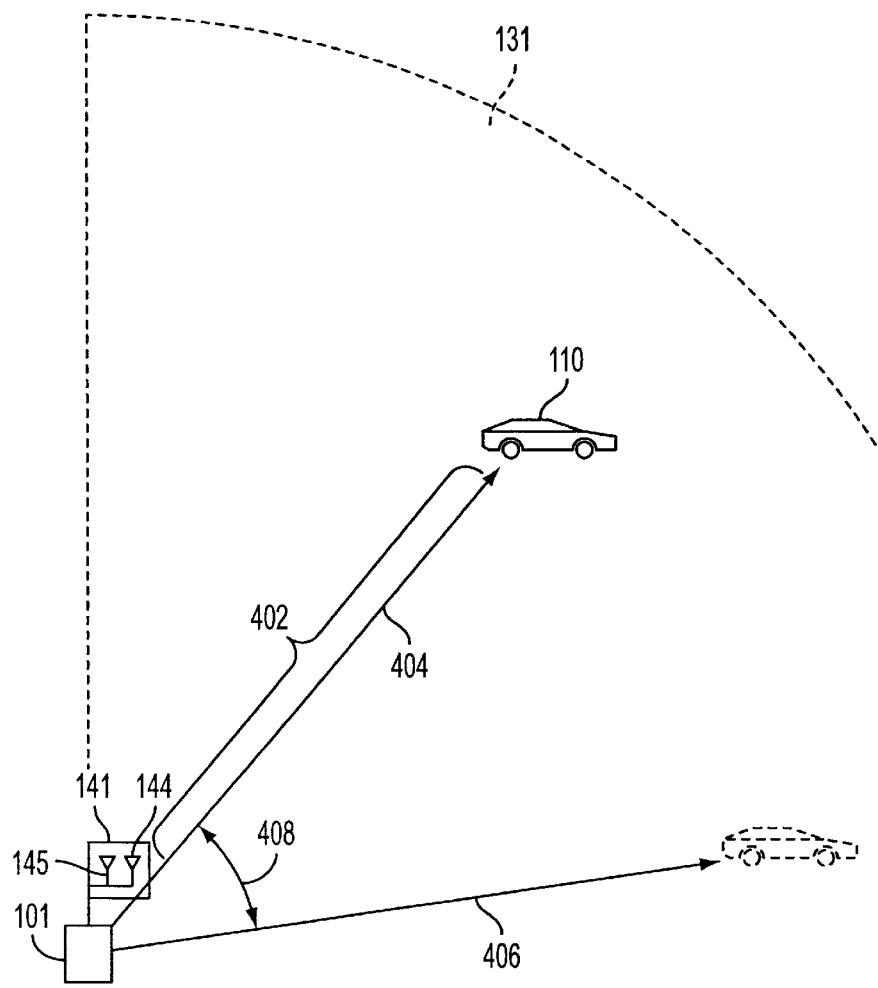
FIG. 4 is an illustration of the use of vectors to determine whether to employ an antenna array beamforming technique in accordance with a preferred embodiment of the present invention.

System 100 then compares the estimated geographical direction to communication unit 110 from base site 101 to the determined bearing from base site 101 to communication unit 110, determines a difference between the estimated geographical direction and the determined bearing, and compares the determined difference to a difference threshold. FIG. 4 illustrates the use of vectors to make the comparison and to determine the difference, and is presented herein for the purpose of better enabling the reader to understand the principles of the invention. Processor 210 determines a first vector 404 extending from base site 101 toward the determined geographical location of communication unit 110 (i.e., the determined bearing from base site 101 to communication unit 110) and a second vector 406 extending from base site 101 in the direction of the estimated geographical direction to communication unit 110. Processor 210 then determines an angular difference 408 (i.e., a cross-angle) between first vector 404 and second vector 406.

Processor 210 compares cross-angle 408 to a predetermined angular threshold. A value for the predetermined angular threshold is based on a desire to maximize the probability of reaching a communication unit with a transmitted signal and a desire to minimize the probability of interfering with other broadcasts in a sector (i.e., sector 131). Factors such as a traffic level in sector 131, geographical features (such as hills and buildings) of the sector, a signal propagation model used to characterize a propagation of a signal in sector 131, and the number of antennas in an antenna array may be considered in selecting a predetermined angular threshold. For example, if antenna array 141 includes two antennas, a cross-angle of approximately 80° may be appropriate, while if antenna array 141 includes four antennas, a cross-angle of approximately 50° may be appropriate since the antenna array is capable of transmitting a more narrowly focused beam when the array includes a greater number of antennas.

When cross-angle 408 is greater than the predetermined angular threshold, then base site 101 determines not to employ an antenna array beamforming technique and to instead broadcast at a maximum beamwidth. However, when cross-angle 408 is less than or equal to the predetermined angular threshold and, as detailed above, the determined distance between between base site 101 and the determined geographical location of communication unit 110, shown in FIG. 4 as determined distance 402, is greater than the predetermined distance threshold, then processor 210 determines whether to employ an antenna array beamforming technique based on a signal quality metric rate of change as described below.

The signal quality metric rate of change is based on multiple determinations of a signal quality metric, which signal quality metric is determined as follows. As shown in FIG. 2, each base site 101–103 further includes a signal summer 230 coupled to a means for analyzing a spectrum of an RF input signal 232, preferably a spectrum analyzer for analyzing the spectrum of received RF signal 150, which summer 230 and spectrum analyzer 232 preferably are each included in processor 210. The first digitized baseband signal, which is derived from the first received signal, and the second digitized baseband signal, which is derived from the second received signal, are combined in summer 230 to produce a combined baseband signal. The combined baseband signal is then fed to spectrum analyzer 232 and a signal quality metric, preferably a signal-to-noise ratio (SNR), is determined. Those of ordinary skill in the art appreciate that there are a variety of signal quality metrics, such as signal power or bit error rates (for digital communication systems), that may be used here without departing from the spirit and scope of the present invention. The use of SNR herein is meant to present to the reader an example of a signal quality metric to better illustrate the principles of the present invention.

The SNR is determined by spectral analysis techniques. The spectrum of the combined baseband signal is analyzed in spectrum analyzer 232. In the preferred embodiment, the functions of spectrum analyzer 232 are performed by processor 210, which performs a fast Fourier transform (FFT) on the combined baseband signal in order to determine the combined baseband signal's frequency components and their magnitudes. The magnitudes of the frequency components are then used to calculate the total power, preferably in decibels referenced to a milliwatt (dBm), in the communication channel and in upper and lower frequency bands adjacent to the communication channel. Processor 210 then calculates a ratio of the in-band and adjacent band total power levels to produce a SNR, and stores the SNR in memory 212. Those of ordinary skill in the art appreciate that there are other well known spectral analysis techniques, such as a discrete transform to obtain the frequency spectrum of the combined baseband signal and average power calculations for comparing in-band and adjacent band power levels, that may be used here without departing from the spirit and scope of the present invention. The use of FFT and total power herein is meant to present to the reader an example of a spectral analysis technique to better illustrate the principles of the present invention.

In the preferred embodiment, base site 101 periodically, preferably once every 0.4 second, determines and stores a signal quality metric, as described above, for signals received from communication unit 110. With reference to memory 212, processor 210 compares each newly determined signal quality metric (i.e., SNR) to an immediately preceding signal quality metric determination and determines a signal quality metric rate of change (i.e., a rate of change in the SNR's) based on a difference between the two signal quality metrics. Processor 210 then compares the determined signal quality metric rate of change to a predetermined signal quality metric rate of change threshold. The rate of change threshold is determined by the designer of system 100, preferably based on factors such as the traffic pattern and traffic level in the sector (i.e., sector 131), and the number of obstructions in the sector. Those who are ordinary skill in the art realize that a variety of values may be used for the predetermined rate of change threshold without departing form the spirit and scope of the present invention.

In the preferred embodiment, the predetermined rate of change threshold is the maximum rate of signal quality deterioration tolerated by system 100, due to fading or obstructions or a variety of other factors, beyond which system 100, preferably base site 101, will not employ an antenna array beamforming technique. Processor 210 to subtracts a newly determined signal quality metric from a preceding signal quality metric determination to determine a signal quality metric rate of change. If the difference is greater than the predetermined rate of change threshold, then processor 210 employs a maximum beamwidth for transmissions to communication unit 110. For example, and merely for the purpose of illustrating the principles of the present invention, if the newly determined SNR is '−10 dBm' and the immediately preceding SNR is '0 dBm,' a signal quality metric rate of change is '0 dBm−(−10 dBm)= 10 dBm per second.' The determined rate of change (10 dBm per second) is compared to a predetermined rate of change threshold, for example '8 dBm per second.' When the determined rate of change is greater than the rate of change threshold, processor employs a maximum beamwidth for transmissions to communication unit 110. However, when the determined rate of change is less than or equal to the rate of change threshold, and, as described above, cross-angle 408 is less than or equal to the predetermined angular threshold and determined distance 402 is greater than the predetermined distance threshold, then processor 210 determines to employ an antenna array beamforming technique.

Antenna beamforming techniques are well-known in the art. Many are based on focusing an antenna beam in the direction of maximum received (by base site 101 from communication unit 110) signal strength. In the preferred embodiment, base site 101 employs an antenna beamforming technique described in U.S. pat. No. 5,936,569, "Method and Arrangement for Adjusting Antenna Pattern," which patent has been assigned to the assignee of the present invention and is hereby incorporated herein. The technique used to determine a pattern of an antenna beam is not critical to the present invention, and those who are of ordinary skill in the art realize that any one of numerous beamforming methods may be used here without departing from the spirit and scope of the present invention.

The preferred embodiment of the present invention considers three determined differences between factors determined by system 100 and each of three predetermined thresholds before determining to employ an antenna array beamforming technique. However, in alternative embodiments of the present invention, system 100, preferably base site 101, determines whether to employ an antenna array beamforming technique based on any one of the three determined differences. That is, base site 101 may determine to employ an antenna array beamforming technique when determined distance 402 is greater than the predetermined distance threshold and to employ a maximum beamwidth broadcast when determined distance 402 is less than or equal to the predetermined distance threshold. Alternatively, base site 101 may determine to employ an antenna array beamforming technique when cross-angle 408 is less than or equal to the predetermined angular threshold and to employ a maximum beamwidth broadcast when cross-angle 408 is greater than the predetermined angular threshold. Or in another alternative embodiment, base site 101 may determine to employ an antenna array beamforming technique when the determined signal quality metric rate of change is less than or equal to the predetermined signal quality metric rate of change threshold and to employ a maximum beamwidth broadcast when the determined signal quality metric rate of change is greater than the predetermined signal quality metric rate of change threshold.

By determining to employ an antenna array beamforming technique in some situations and a maximum beamwidth in other situations, the present invention seeks to optimize a probability that a signal transmit by base site 101 will be received by communication unit 10 while minimizing the potential for interference of the broadcast to communication unit 110 with broadcasts to other communication units in sector 131, thereby optimizing a usage of the antenna array beamforming technique. A difference between the bearing from base site 101 to communication unit 110 and the direction of arrival of signals received from communication unit 110 that exceeds a predetermined threshold indicates that an antenna array beamforming technique, which focuses an antenna array beam in the direction of maximum received signal strength, would result in a misdirected antenna beam. In such an instance, use of a maximum antenna beamwidth would better assure reception by communication unit 110 of a signal transmitted by base site 101. Furthermore, by monitoring a rate of change in a signal quality metric, base site 101 can determine whether a communication unit is unable to acceptably receive a slightly misdirected beamed signal, for example because the communication unit has passed behind a building or is passing through an urban canyon, and a diffraction or diffusion of a maximum beamwidth broadcast may be more appropriate. In addition, when communication unit 110 is within a predetermined distance of the base site, then a maximum beamwidth broadcast should have ample energy for reaching communication unit 110 whereas a narrowly focused beam may not be able to keep up with the movements of communication unit 110.

Figure 5A:
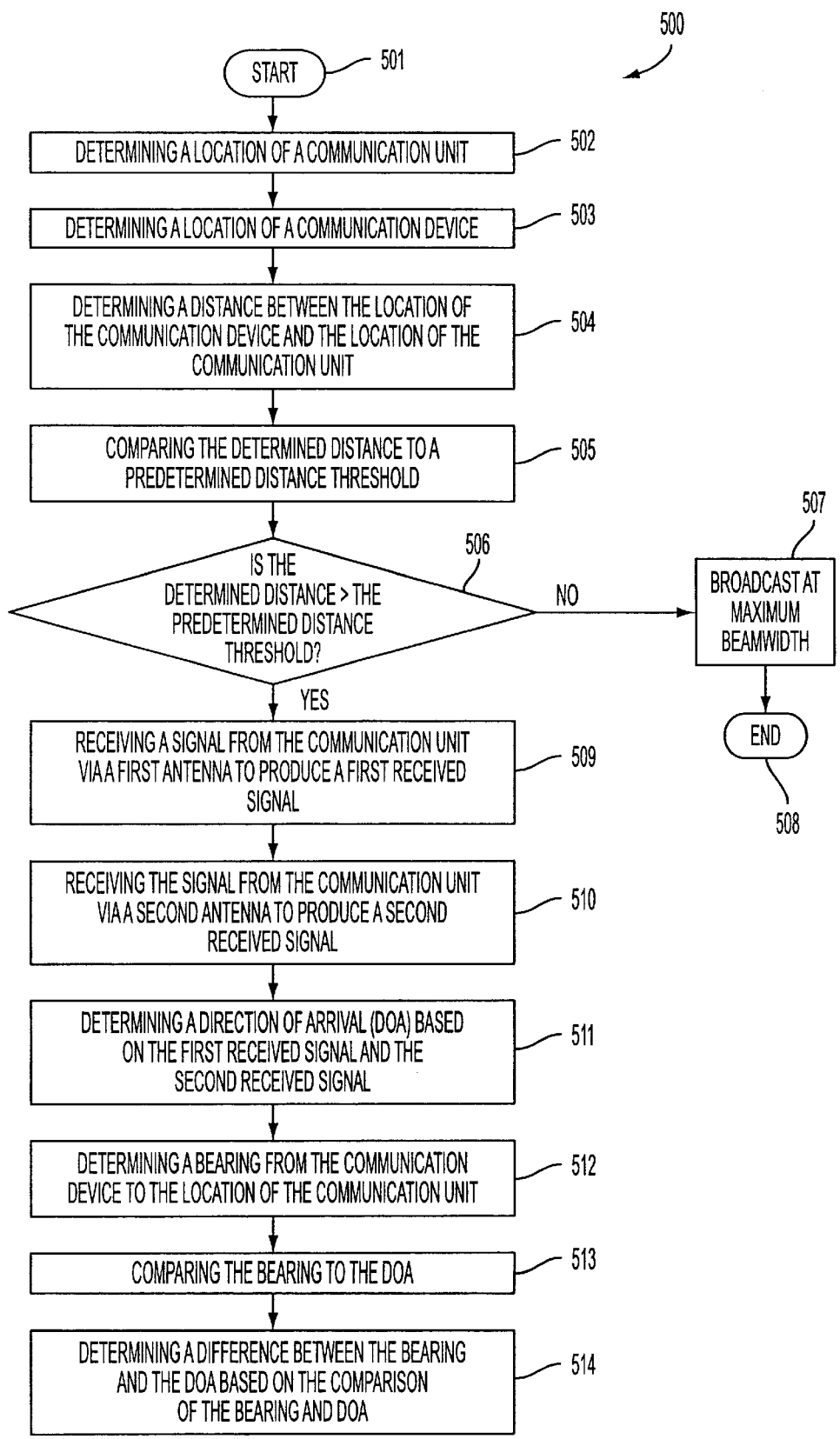
FIG. 5a is a logic flow diagram of the steps executed by a communication device to determine whether to employ an antenna array beamforming technique in accordance with a preferred embodiment of the present invention.
Figure 5B:
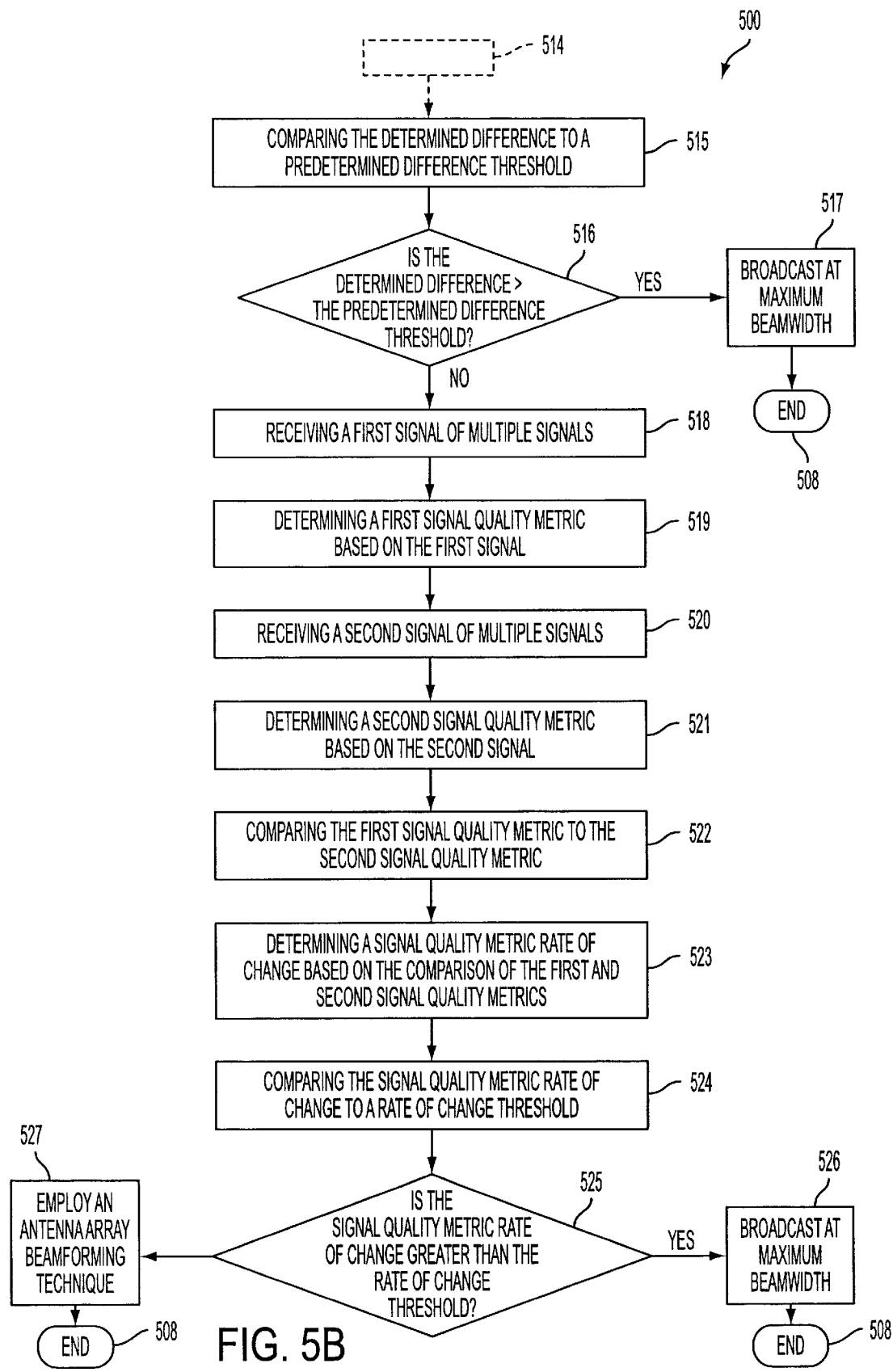
FIG. 5b is a continuation of FIG. 5a and is a logic flow diagram of the steps executed by a communication device to determine whether to employ an antenna array beamforming technique in accordance with a preferred embodiment of the present invention.

FIG. 5 is a logic flow diagram 500 of the steps executed by a communication device to determine whether to employ an antenna array beamforming technique and thereby optimize the usage of the antenna array beamforming technique in accordance with a preferred embodiment of the present invention. In the preferred embodiment, the communication device is a base site that includes an antenna array that includes multiple antennas. The communication device further includes multiple receiver units wherein each antenna of the multiple antennas is coupled to a separate receiver unit of the multiple receiver units, a processor coupled to each of the multiple receiver units, and a memory coupled to the processor.

The logic flow begins (501) when the communication device, preferably a base site, determines (502) a location of a communication unit, preferably a cellular telephone or a radiotelephone. Preferably the communication device determines the location of the communication unit based on a time of arrival of a signal at each of multiple communication devices and by reference to a location database that stores the geographical location of each of the multiple communication devices. The communication device determines (503) its own location, preferably by reference to the location database, and determines (504) a distance between the location of the communication device and the location of the communication unit. The communication device compares (505) the determined distance to a predetermined distance threshold, and determines (506) whether to employ an antenna array beamforming technique.

When the determined distance is less than or equal to the predetermined distance threshold, the communication device determines (507) to broadcast at a maximum beamwidth, and the logic flow ends (508). When the determined distance is greater than the predetermined distance threshold, then the communication device also determines a direction of arrival (DOA) before determining to employ an antenna array beamforming technique.

In order to determine a DOA, the communication device receives (509) a signal from the communication unit via a first antenna of the multiple antennas to produce a first received signal, and receives (510) the signal from the communication unit via a second antenna of the multiple antennas to produce a second received signal. The communication device then determines (511) a DOA of the signal based on the first received signal and the second received signal. In the preferred embodiment, the communication device determines a time of arrival of the first received signal and a time of arrival of the second received signal. Alternatively, the communication device determines a phase of the first received signal and a phase of the second received signal. The communication device then determines a DOA of the signal by executing a DOA algorithm stored in the memory and based on the determined times of arrival, or alternately the phases, of the first and second received signals. The determined DOA of the signal constitutes an estimated geographical direction to the communication unit from the communication device based on the signal received by the communication device from the communication unit.

The communication device determines (512) a bearing from the communication device to the determined location of the communication unit and then compares (513) the bearing to the DOA of the signal. In the preferred embodiment, the communication device determines a first vector based on the bearing and determines a second vector based on the DOA. The communication device then compares the two vectors and determines (514) a difference between the bearing and the DOA based on the comparison of the two vectors, which difference is determined as an angular difference (i.e., a cross-angle) between the two vectors.

The communication device compares (515) the determined difference between the first and second vectors, that is the cross-angle, to a predetermined difference threshold, preferably a predetermined angular threshold, and, based on the comparison, determines (516) whether to employ an antenna array beamforming technique. When the determined difference is greater than the predetermined angular threshold, the communication device determines (517) not to employ an antenna array beamforming technique and to instead to employ a maximum bandwidth broadcast, and the logic flow ends (508). When the determined difference is less than or equal to the predetermined angular threshold, the communication device further determines a signal quality metric rate of change before determining to employ an antenna array beamforming technique.

In order to determine a signal quality metric rate of change, the communication device receives (518) a first signal of multiple signals transmitted to the communication device by the communication unit and determines (519) a first signal quality metric based on the first signal. The communication device also receives (520) a second signal of the multiple signals and determines (521) a second signal quality metric based on the second signal, wherein the second signal is different from the first signal. Preferably, the first and second signal quality metrics are each a signal-to-noise ratio (SNR); however, those of ordinary skill in the art realize that other signal quality metrics may be used here, such as signal power or bit rate error, without departing from the spirit and scope of the present invention. The communication device compares (522) the first signal quality metric to the second signal quality metric and determines (523) a signal quality metric rate of change based on the comparison of the first and second signal quality metrics.

The communication device compares (524) the signal quality metric rate of change to a predetermined signal quality metric rate of change threshold and determines (525) whether to employ an antenna array beamforming technique. As detailed above, the predetermined rate of change threshold is the maximum rate of signal quality deterioration tolerated by the communication device, due to fading or obstructions or a variety of other factors, before the communication device determines not to employ an antenna array beamforming technique. When the signal quality metric rate of change is greater than the predetermined rate of change threshold, the communication device employs (526) a maximum beamwidth broadcast and the logic flow ends (508). When the determined rate of change is less than or equal to the predetermined rate of change threshold, and the determined distance is greater than the determined distance threshold, and the angular difference is less than or equal to the predetermined angular threshold, the communication device employs (527) an antenna beamforming technique and the logic flow ends (508).

The preferred embodiment of the present invention compares each of three determinations (i.e., the determined distance to the communication unit, the determined difference between the bearing to the communication unit and the DOA, and the determined signal quality metric rate of change) to three respective thresholds (i.e., the predetermined distance threshold, the predetermined difference threshold, and the predetermined signal quality metric rate of change threshold) before determining to employ an antenna array beamforming technique. However, those who are of ordinary skill in the art realize that not all of steps (501)–(527) are necessary for a communication device to determine whether to employ an antenna array beamforming technique. In a first alternative embodiment of the present invention, a communication device executes steps (502)–(506). Then, when the determined distance is less than or equal to the predetermined distance threshold (step (506)), the antenna array broadcasts (507) at maximum bandwidth and the logic flow ends (508). When the determined distance is greater than the predetermined distance threshold (step (506)), the antenna array employs an antenna beamforming technique (step (527)) and the logic flow ends.

In a second alternative embodiment of the present invention, a communication device executes steps (502), and (509)–(516). Then, when the determined difference between the location of the communication device and the DOA is greater than the predetermined difference threshold (step (516)), the antenna array broadcasts (517) at maximum bandwidth and the logic flow ends (508). When the determined distance is less than or equal to the predetermined difference threshold (step (516)), the antenna array employs an antenna beamforming technique (step (527)) and the logic flow ends (508).

In a third alternative embodiment of the present invention, a communication device executes steps (518)–(525). Then, when the determined difference between the location of the communication device and the DOA is greater than the predetermined difference threshold (step (525)), the antenna array broadcasts (526) at maximum bandwidth and the logic flow ends (508). When the determined distance is less than or equal to the predetermined difference threshold (step (525)), the antenna array employs (527) an antenna beamforming technique and the logic flow ends (508).

In sum, the present invention provides a method and apparatus for optimizing the usage of the antenna array beamforming technique by determining whether to employ an antenna array beamforming technique for a broadcast of an RF signal by a communication device, preferably a base site, to a communication unit. The base site includes an antenna array, which antenna array includes multiple antennas. The base site determines a geographical location of the communication unit, a bearing from the base site to the determined location of the communication unit, and a DOA of a signal received by the base site from the communication unit via each of the multiple antennas. The base site compares the bearing to the DOA, determines a difference based on the comparison, and compares the determined difference to a predetermined difference threshold. The base site also determines a distance between the base site and the communication unit, and compares the determined distance to a predetermined distance threshold. The base site also determines multiple signal quality metrics based on signals received from the communication unit, determines a signal quality metric rate of change based on the multiple signal quality metrics, and compares the determined signal quality metric rate of change to a predetermined signal quality metric rate of change threshold. Based on the comparisons of the determined difference, the determined distance, and the determined signal quality metric rate of change to each of their respective thresholds, the base site determines whether to employ an antenna array beamforming technique.

By using the present invention, a base site optimizes a probability that a signal transmit by the base site will be received by the communication unit while minimizing the potential for interference of the broadcast to the communication unit with broadcasts to other communication units. The present invention optimizes a usage of the antenna array beamforming technique by providing for the employment of a maximum beamwidth broadcast in an environment where fading or the presence of obstructions between the communication unit and the base site result in a misdirected beamed signal when an antenna array beamforming technique is employed, which misdirected beamed signal may not be acceptably received by the communication unit. However, in an environment where an impact of fading and obstructions is not as great, the present invention optimizes the usage of the antenna array beamforming technique by employing the antenna array beamforming technique, which results in a beamed signal that provides minimum interference with broadcasts to nearby communication units.

While the present invention has been particularly shown and described with reference to particular embodiments thereof, it will be understood by those skilled in the art that various changes in form and details may be made therein without departing from the spirit and scope of the present invention.

What is claimed is:

1. In a wireless telecommunication system that includes a communication device, which communication device comprises an antenna array that comprises a plurality of antennas, a method for determining whether to employ an antenna array beamforming technique and thereby optimizing a usage of the antenna array beamforming technique, the method comprising steps of:

determining a location of a communication unit;

determining a location of the communication device;

determining a distance between the location of the communication unit and the location of the communication device;

comparing the determined distance to a predetermined distance threshold; and determining whether to employ an antenna array beamforming technique based on the comparison of the determined distance to a predetermined distance threshold.

2. The method of claim 1, wherein the step of determining whether to employ an antenna array beamforming technique comprises a step of determining to employ an antenna array beamforming technique when the determined distance is greater than the predetermined distance threshold.

3. In a wireless telecommunication system that includes a communication device, which communication device comprises an antenna array that comprises a plurality of antennas, a method for determining whether to employ an antenna array beamforming technique and thereby optimizing a usage of the antenna array beamforming technique, the method comprising steps of:

determining a bearing from the communication device to a location of a communication unit;

receiving a signal from the communication unit via a first antenna of the plurality of antennas to produce a first received signal;

receiving the signal from the communication unit via a second antenna of the plurality of antennas to produce a second received signal;

determining a direction of arrival of the signal based on the first received signal and the second received signal;

comparing the location of the communication unit to the direction of arrival of the signal;

determining a difference between the bearing and the direction of arrival based on the comparison; and determining whether to employ an antenna array beamforming technique based on the determined difference.

4. The method of claim 3, further comprising a step of comparing the determined difference to a predetermined difference threshold, and wherein the step of determining whether to employ an antenna array beamforming technique comprises a step of determining whether to employ an antenna array beamforming technique based on the comparison of the determined difference to the predetermined difference threshold.

5. The method of claim 3, wherein the step of determining a direction of arrival of the signal comprises steps of:

determining a time of arrival of the first received signal;

determining a time of arrival of the second received signal; and determining a direction of arrival of the signal based on the time of arrival of the first received signal and the time of arrival of the second received signal.

6. The method of claim 3, wherein the step of determining direction of arrival of the signal comprises steps of:

determining a phase of the first received signal;

determining a phase of the second received signal; and determining a direction of arrival of the signal based on the phase of the first received signal and the phase of the second received signal.

7. The method of claim 3, wherein the step of comparing the location of the communication unit to the direction of arrival of the signal comprises steps of:

determining a first vector based on the bearing;

determining a second vector based on the direction of arrival; and comparing the first vector to the second vector.

8. The method of claim 7, wherein the step of determining a difference between the bearing and the direction of arrival comprises a step of determining an angular difference between the first vector and the second vector.

9. The method of claim 8, further comprising a step of comparing the angular difference to a predetermined angular threshold, and wherein the step of determining whether to employ an antenna array beamforming technique comprises a step of determining whether to employ an antenna array beamforming technique based on the comparison of the angular difference to the predetermined angular threshold.

10. The method of claim 3, further comprising steps of:

determining a location of the communication device;

determining a distance between the communication unit and the communication device;

comparing the determined distance to a predetermined distance threshold; and wherein the step of determining whether to employ an antenna array beamforming technique comprises a step of determining whether to employ an antenna array beamforming technique based on the determined difference between the bearing and the direction of arrival and on the comparison of the determined distance to the predetermined distance threshold.

11. The method of claim 10, wherein the base site receives a plurality of signals from the communication unit and wherein the method further comprises steps of:

receiving a first signal of the plurality of signals from the communication unit;

determining a first signal quality metric based on the first signal;

receiving a second signal of the plurality of signals from the communication unit;

determining a second signal quality metric based on the second signal;

comparing the first signal quality metric to the second signal quality metric to produce a signal quality metric rate of change; and wherein the step of determining whether to employ an antenna array beamforming technique comprises a step of determining whether to employ an antenna array beamforming technique based on the determined difference between the bearing and the direction of arrival, on the comparison of the determined distance to the predetermined distance threshold, and on the signal quality metric rate of change.

12. The method of claim 11, further comprising steps of:

comparing the determined difference between the bearing and the direction of arrival to a predetermined difference threshold;

comparing the signal quality metric rate of change to a predetermined signal quality metric rate of change threshold; and wherein the step of determining whether to employ antenna array beamforming technique comprises steps of determining not to employ an antenna array beamforming technique when the determined difference is greater than the predetermined difference threshold, the determined distance is less than the predetermined distance threshold, or the signal quality metric rate of change is greater than the predetermined signal quality metric rate of change threshold, and determining to employ an antenna array beamforming technique when the determined difference is less than the predetermined difference threshold, when the determined distance is greater than the predetermined distance threshold, and when the signal quality metric rate of change is less than the predetermined signal quality metric rate of change threshold.

13. The method of claim 3, wherein the base site receives a plurality of signals from the communication unit and wherein the method further comprises steps of:

receiving a first signal of the plurality of signals from the communication unit;

determining a first signal quality metric based on the first signal;

receiving a second signal of the plurality of signals from the communication unit;

determining a second signal quality metric based on the second signal;

comparing the first signal quality metric to the second signal quality metric; and wherein the step of determining whether to employ an antenna array beamforming technique comprises a step of determining whether to employ an antenna array beamforming technique based on the determined difference between the bearing and the direction of arrival and on the comparison of the first signal quality metric to the second signal quality metric.

14. The method of claim 13, further comprising steps of:

determining a signal quality metric rate of change based on the comparison of the first signal quality metric to the second signal quality metric;

comparing the signal quality metric rate of change to a predetermined signal quality metric rate of change threshold; and wherein the step of determining whether to employ an antenna array beamforming technique comprises a step of determining whether to employ an antenna array beamforming technique based on the determined difference between the bearing and the direction of arrival and on the comparison of the signal quality metric rate of change to the predetermined signal quality metric rate of change threshold.

15. In a base site comprising an antenna array, which antenna array comprises a plurality of antennas and which base site employs an antenna array beamforming technique, a method for determining whether to employ an antenna array beamforming technique and thereby optimizing a usage of the antenna array beamforming technique, the method comprising steps of:

receiving a first signal from a communication unit;

determining a first signal quality metric based on the first signal;

receiving a second signal from the communication unit;

determining a second signal quality metric based on the second signal;

comparing the first signal quality metric to the second signal quality metric; and determining whether to employ an antenna array beamforming technique based on the comparison of the first signal quality metric to the second signal quality metric.

16. The method of claim 15, further comprising steps of:

determining a signal quality metric rate of change based on the comparison of the first signal quality metric to the second signal quality metric;

comparing the signal quality metric rate of change to a predetermined signal quality metric rate of change threshold; and wherein the step of determining whether to employ an antenna array beamforming technique comprises a step of determining whether to employ an antenna array beamforming technique based on the comparison of the signal quality metric rate of change to the predetermined signal quality metric rate of change threshold.

17. An apparatus comprising a communication device that includes:

an antenna array having a first antenna that receives a signal from a communication unit to produce a first received signal and a second antenna that receives the signal from the communication unit to produce a second received signal;

a processor coupled to the antenna array that determines a geographical location of the communication unit, determines a bearing from the communication device to the geographical location of the communication unit, determines a time of arrival of the first received signal, determines a time of arrival of the second received signal, determines a direction of arrival of the signal from the communication unit based on the time of arrival of each of the first and second received signals, compares the bearing to the direction of arrival, determines a difference between the bearing and the direction of arrival based on the comparison, compares the determined difference to a predetermined difference threshold, and optimizes a usage of an antenna array beamforming technique by determining whether to employ the antenna array beamforming technique based on the comparison of the determined difference to the predetermined difference threshold; and a memory coupled to the processor that stores the determined location of the communication device, the predetermined difference threshold, and a direction of arrival algorithm.

18. The apparatus of claim 17, wherein the processor further determines a distance between the communication unit and the base site, compares the determined distance to a predetermined distance threshold, and determines whether to employ an antenna array beamforming technique based on the comparison of the determined difference to the predetermined difference threshold and on the comparison of the determined distance to the predetermined distance threshold, and wherein the predetermined distance threshold is stored in the memory.

19. The apparatus of claim 18, wherein the processor further receives a plurality of signals from the communication unit, determines a first signal quality metric for a first signal of the plurality of signals, receives a second signal of the plurality of signals from the communication unit, determines a second signal quality metric for the second signal, compares the first signal quality metric to the second signal quality metric to produce a signal quality metric rate of change, compares the signal quality metric rate of change to a predetermined signal quality metric rate of change threshold, and determines whether to employ an antenna array beamforming technique based on the comparison of the determined difference to the predetermined difference threshold, the comparison of the determined distance to the predetermined distance threshold, and the comparison of the signal quality metric rate of change to the predetermined signal quality metric rate of change threshold, and wherein the predetermined signal quality metric rate of change threshold is stored in the memory.

20. The apparatus of claim 19, wherein the processor determines not to employ an antenna array beamforming technique when the determined difference is greater than the predetermined difference threshold, the determined distance is less than the predetermined distance threshold, or the signal quality metric rate of change is greater than the predetermined signal quality metric rate of change threshold, and determines to employ an antenna array beamforming technique when the determined difference is less than the predetermined difference threshold, when the determined distance is greater than the predetermined distance threshold, and when the signal quality metric rate of change is less than the predetermined signal quality metric rate of change threshold.

* * * * *